Aug. 11, 1936.                L. BACQUEYRISSE                 2,050,252
ELECTRIC TRACTION SYSTEM WITH COMPOUND MOTORS AND ELECTRIC BRAKING
Filed Jan. 27, 1933                  4 Sheets-Sheet 2
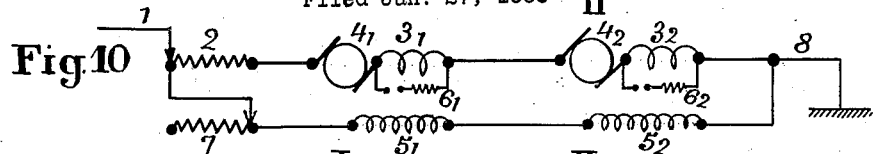
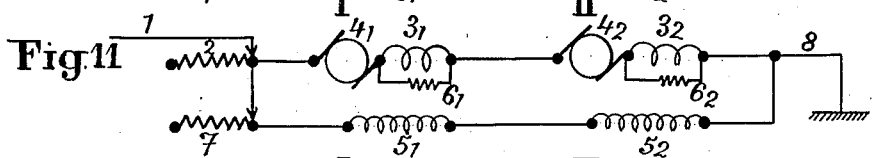
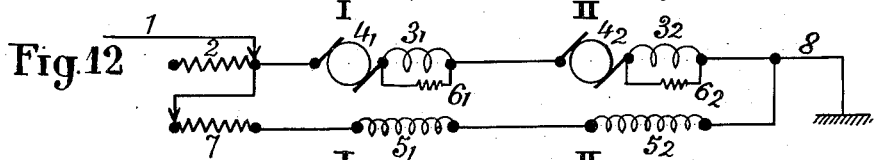
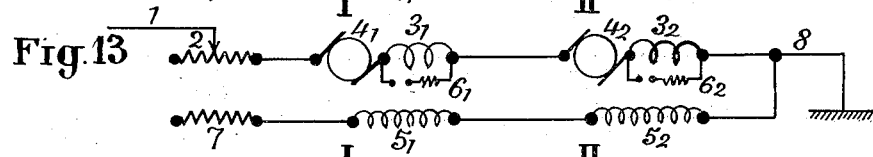
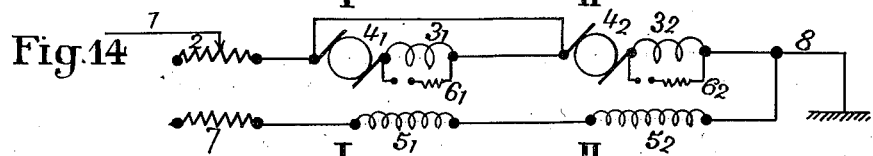
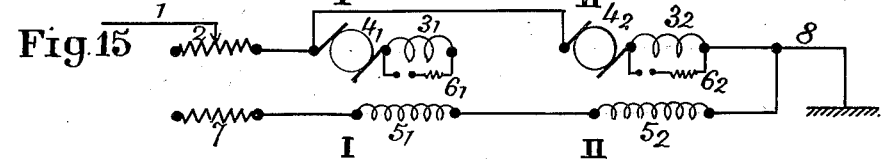
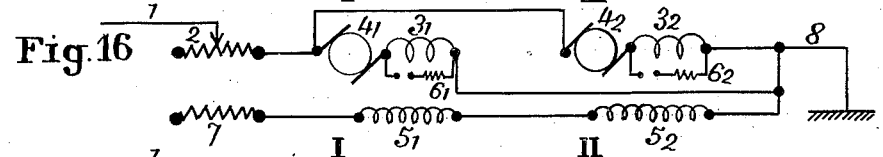
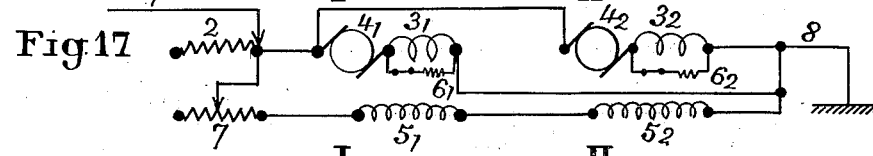
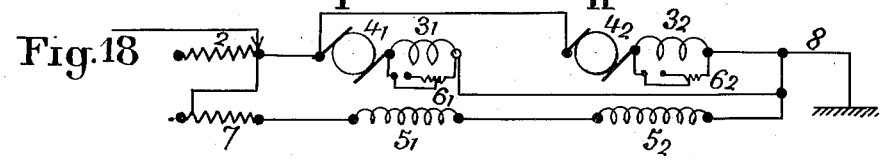
L. Bacqueyrisse
INVENTOR
By: Marks & Clerk
ATTYS.

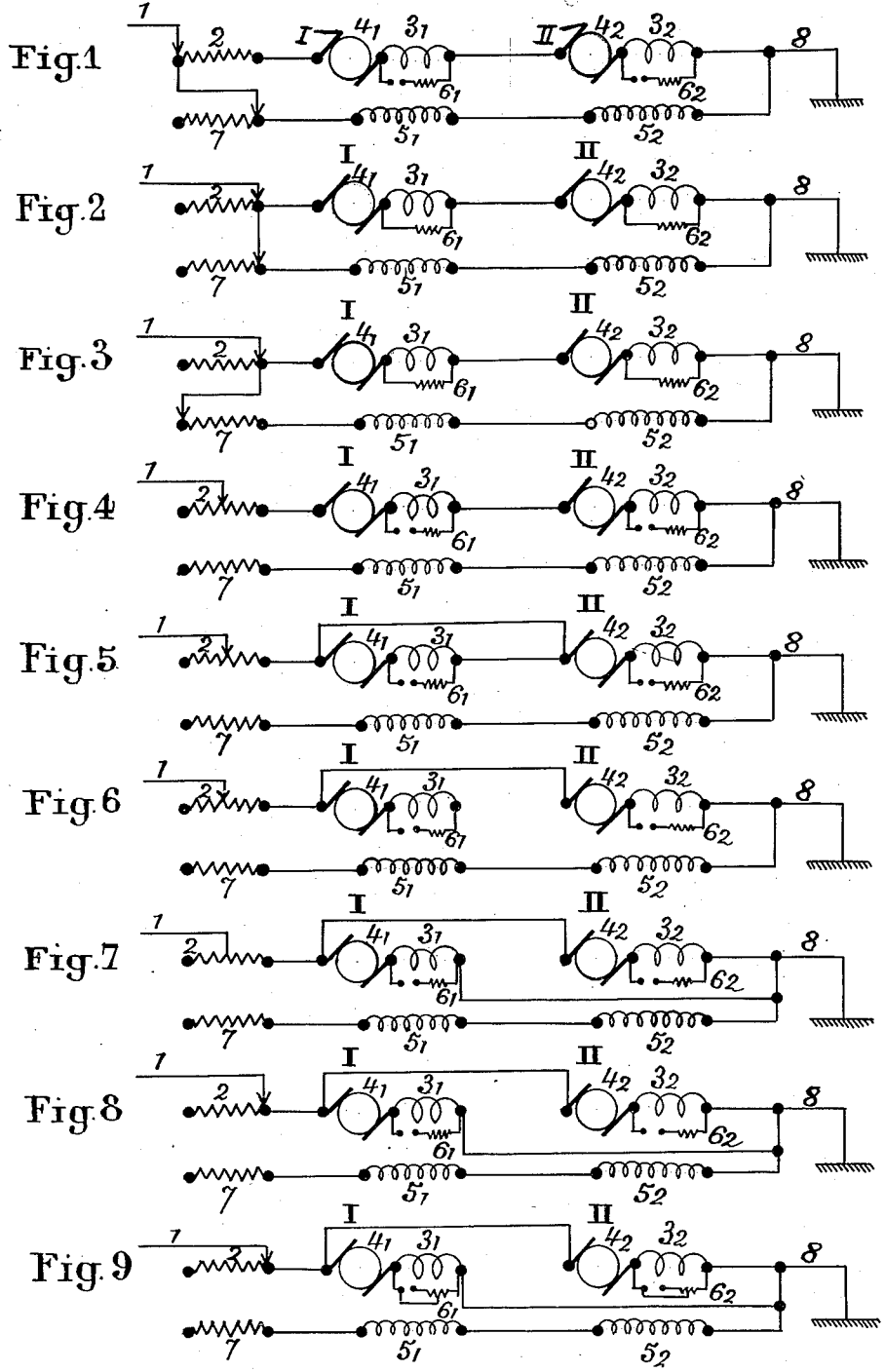

Aug. 11, 1936.    L. BACQUEYRISSE    2,050,252
ELECTRIC TRACTION SYSTEM WITH COMPOUND MOTORS AND ELECTRIC BRAKING
Filed Jan. 27, 1933    4 Sheets-Sheet 3
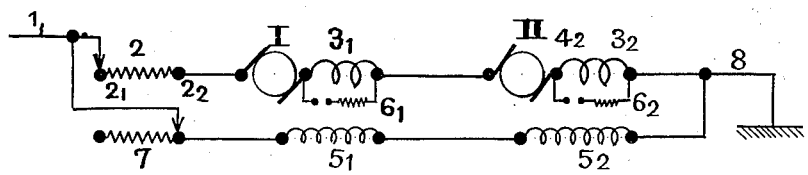
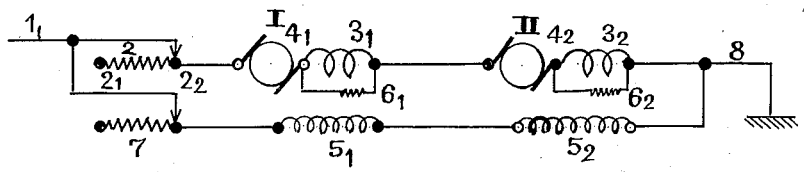
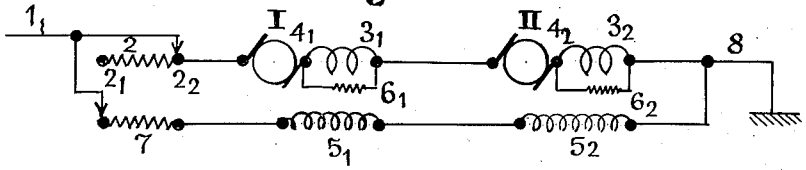
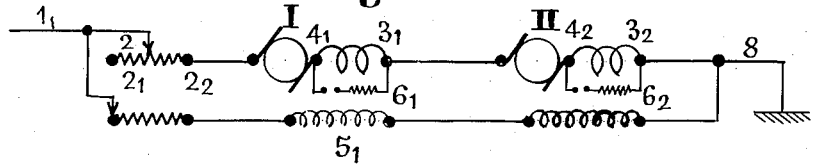
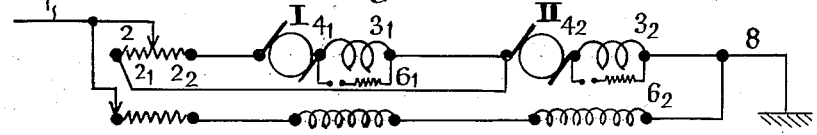

Aug. 11, 1936.    L. BACQUEYRISSE    2,050,252
ELECTRIC TRACTION SYSTEM WITH COMPOUND MOTORS AND ELECTRIC BRAKING
Filed Jan. 27, 1933    4 Sheets-Sheet 4

L. Bacqueyrisse
INVENTOR

By Marks & Clerk
ATTYS.

Patented Aug. 11, 1936

2,050,252

UNITED STATES PATENT OFFICE 2,050,252

ELECTRIC TRACTION SYSTEM WITH COMPOUND MOTORS AND ELECTRIC BRAKING

Louis Bacqueyrisse, Paris, France

Application January 27, 1933, Serial No. 653,890
In France January 30, 1932

3 Claims. (Cl. 172—179)

This invention relates to an electric traction system using compound wound motors and by which the motors may be operated at low and constant speed or at widely increased speeds with regenerative braking.

The system according to the invention comprises compound motors connected in series for starting and for normal operation at average speed and operating as series motors connected in parallel for higher speeds, the transition from series to parallel being effected after eliminating the shunt field winding.

During transition periods and during the period of parallel connection of the series field windings the latter are wholly in circuit, the excitation of the series field windings being reduced during the series operation of said motors as by connecting a diverting resistance across the series windings.

During transition from parallel to series and the introduction of the shunt field windings in the circuit and increasing the excitation thereof, braking by regeneration is obtained, the regenerative effect being determined by the relative excitation of the shunt field windings and the series field windings, the series windings exerting a differential action resulting in a progressive application of the braking effect.

In the accompanying drawings wherein the invention is illustrated, Figs. 1 to 9 are diagrammatic views of the improved system illustrating the various changes in the connections.

Figs. 10 to 18 correspond with Figs. 1 to 9 and show a modification of the invention.

Figs. 19 to 28 are diagrammatic views of a further modification of the invention.

Referring to the drawings in detail, the numeral 1 indicates the positive pole of the feed line, 2 is the starting resistance and $3_1$ and $3_2$ the series field windings of the motors I and II. The armature windings are indicated at $4_1$ and $4_2$ (including the commutation exciting windings). The shunt field windings are indicated at $5_1$ and $5_2$ and are associated with the motors I and II, respectively. Diverting resistances $6_1$ and $6_2$ are adapted to be connected across the series windings $3_1$ and $3_2$ and the negative pole of the feed line is indicated at 8. A resistance 7 is provided for the purpose of controlling the excitation of the shunt windings $5_1$ and $5_2$.

The condition of the circuit for starting the two compound motors is indicated in Fig. 1 in which the two series windings $3_1$ and $3_2$ are connected in series and the starting resistance 2 is interposed in the circuit thereof. The following successive circuit changes are as follows:

Fig. 2, the resistance 2 is cut out of the circuit and the series windings of the motors I and II are shunted by the resistances $6_1$ and $6_2$. This circuit change is effected to increase the speed of the motors and to reduce the excitation of the series winding which otherwise, during starting, would tend to limit the speed, and, during braking, to reduce the regeneration.

Fig. 3 shows an adjustment whereby the resistance 7 is interposed in the circuit of the shunt windings $5_1$ and $5_2$.

Fig. 4 illustrates the first stage of the transition from series to parallel connection of the series windings $3_1$ and $3_2$ in which the whole or a part of the starting resistance 2 is interposed in the series winding circuit and the shunt resistances $6_1$ and $6_2$ are interrupted. In this state, the resistance 7 is cut out of the circuit and the excitation of the shunt windings $5_1$ and $5_2$ falls to zero.

Fig. 5 illustrates the second stage of the transition wherein the series winding $3_1$ and the armature winding $4_1$ is short circuited.

Fig. 6 illustrates the third stage of the transition wherein the series winding $3_1$ of the motor I is completely eliminated from the circuit.

Fig. 7 illustrates the fourth stage of the transition wherein the parallel connection of the motors I and II in the circuit is established.

Fig. 8 indicates a change wherein the starting resistance 2 is completely eliminated from the circuit.

Fig. 9 illustrates a convenient manner of regulating the speed of the motors by varying the value of the resistances $6_1$ and $6_2$ shunted across the series windings $3_1$ and $3_2$.

By successively effecting the foregoing circuit changes in the reverse order, the system is restored to the condition illustrated in Fig. 3 in which the shunt windings $5_1$ and $5_2$ are again connected in the circuit. The two motors feed back a current the value of which is determined by selection of the value of the shunt and series excitation whereby the desired braking effect may be obtained. The excitation of the shunt windings may be increased by proper regulation of the resistance 7 as will be evident from a comparision of Figs. 2 and 3.

A modification of the invention is illustrated in Figs. 10 to 18 of which Figs. 10 and 16 correspond to the above described Figs. 1 to 7 and the changes in the circuit connections are the same as described in connection with Figs. 1 to 7.

According to Fig. 17, however, after the establishment of the parallel connections for the series windings $3_1$ and $3_2$ illustrated in Fig. 16, excitation of the shunt windings $5_1$ and $5_2$ is reduced to maximum or a high value and the excitation of the series windings $3_1$ and $3_2$ is reduced by inserting resistances $6_1$ and $6_2$ of a suitable value across the terminals of said windings. Also the resistance 2 is eliminated.

Fig. 18 shows a change of circuit connections in which the excitation of the shunt windings $5_1$ and $5_2$ is reduced by a proper adjustment of the resistance 7.

During regeneration the circuit changes are carried out in the reverse order.

Figs. 19 to 28 illustrate a further embodiment of the invention, Figs. 19 and 21 illustrating circuit changes corresponding with Figs. 1 to 3 and with Figs. 10 to 12.

The excitation of the shunt windings is reduced to its maximum value during the transition from series to parallel connection as illustrated beginning with Fig. 21.

Fig. 22 illustrates an interruption of the shunt resistances $6_1$ and $6_2$ and the excitation of the series windings $3_1$ and $3_2$ at maximum value.

Fig. 23 illustrates the short circuiting of the series winding $3_1$ and the armature $4_1$ of the motor I.

Figure 24:
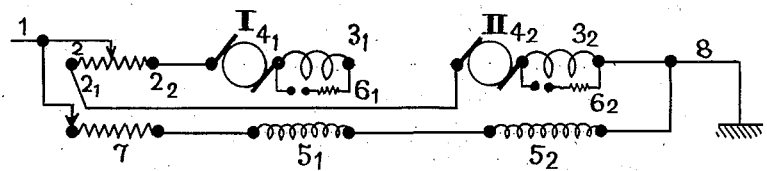

Fig. 24 illustrates the interruption in the circuit of the series winding $3_1$.

Figure 25:
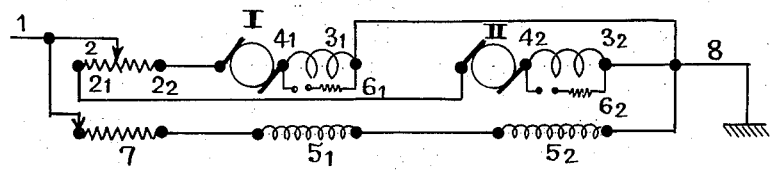

Fig. 25 illustrates the parallel connection of the series windings $3_1$ and $3_2$.

Figure 26:
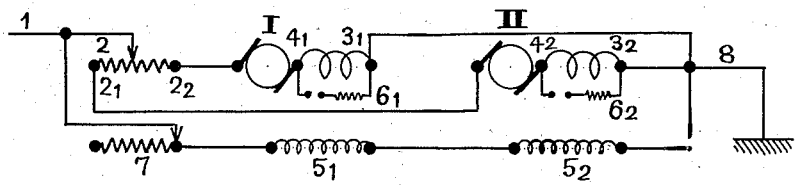

Fig. 26 illustrates a change in the circuit whereby the excitation of the shunt windings $5_1$ and $5_2$ is increased.

Figure 27:
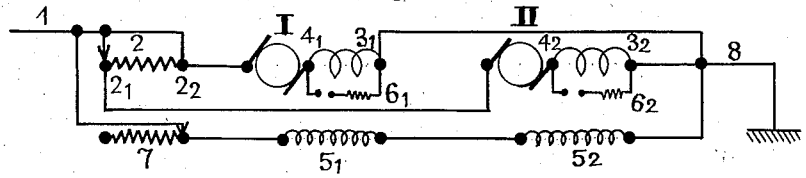
Figure 28:
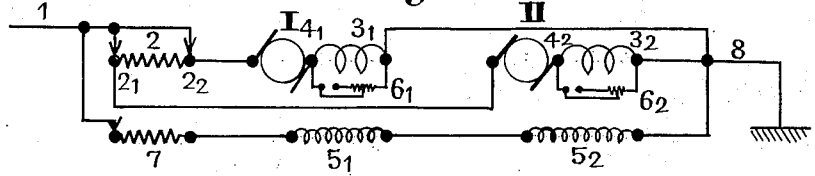

Figs. 27 and 28 correspond with Figs. 17 and 18 and shows the operation of the motors in parallel.

What I claim is:

1. A method of series parallel control of compound motors used also for regenerative braking having armature windings, shunt field windings and series field windings consisting in connecting the armature and series field windings fed by the main current in series with each other for starting and average speed, and thereafter changing said connection to parallel for higher speeds, and maintaining a pure series characteristic during transition from series to parallel connection.

2. A method of series parallel control of compound motors used also for regenerative braking having armature windings, shut field windings connected in series and series field windings consisting in connecting the armature and series field windings fed by the main current in series with each other for starting and average speed, thereafter changing said connection to parallel for higher speeds, permanently maintaining the series connection of said shunt field windings and maintaining a predominant series characteristic during transition from series to parallel connection.

3. A method of series parallel control of compound motors used also for regenerative braking having armature windings, shunt field windings and series field windings, consisting in connecting the armature and series field windings fed by the main current in series with each other for starting and average speeds, thereafter changing said connections to parallel and maintaining a pure series characteristic during the transition from series to parallel connection and during the parallel connection.

LOUIS BACQUEYRISSE.